United States Patent

Low et al.

[15] 3,706,230
[45] Dec. 19, 1972

[54] ROTARY ACTUATOR

[72] Inventors: George M. Low, Acting Administrator of the National Aeronautics and Space Administration with respect to an invention of; Allan R. McDougal, Crescenta, Calif.; Richard L. Moore, Glendora, Calif.

[22] Filed: Jan. 5, 1971

[21] Appl. No.: 104,048

[52] U.S. Cl. .................................................74/2
[51] Int. Cl. ..........................................F16h 5/40
[58] Field of Search ............244/1 SS; 267/154; 74/2

[56] References Cited

UNITED STATES PATENTS

| | | | |
|---|---|---|---|
| 2,358,146 | 9/1944 | Clute | 74/96 UX |
| 3,470,750 | 10/1969 | Wetter | 74/2 |

*Primary Examiner*—Milton Kaufman
*Attorney*—John R. Manning, Monte F. Mott and Wilfred Grifka

[57] ABSTRACT

A rotary actuator particularly suited for use aboard operative spacecraft for deploying pivotally supported structures such as, for example, solar panels and the like. The actuator is characterized by a torsion bar coupled with a pivotally supported crank arm through a gear cluster in a manner such that the torsion bar continuously applies a constant deployment force to said solar panel, when the solar panel is in a retracted configuration; serves to deploy the panel at a controlled, sinusoidal rate of acceleration; and subsequently supports the panel in its deployed configuration with minimal supporting forces being applied to the panel through a maximum moment arm whereby structural rigidity for the deployed panel is achieved.

21 Claims, 14 Drawing Figures

PATENTED DEC 19 1972 3,706,230

ALLAN R. MC DOUGAL
RICHARD L. MOORE
INVENTORS

Wilfred Grifin
Monte F. Mott
ATTORNEYS

ALLAN R. MC DOUGAL
RICHARD L. MOORE
INVENTORS

ATTORNEYS

Fig. 5.

ALLAN R. MC DOUGAL
RICHARD L. MOORE
INVENTORS

ALLAN R. MCDOUGAL
RICHARD L. MOORE
INVENTORS

Wilfred Grifkss
Monte F. Mott
ATTORNEYS

ALLAN R. MCDOUGAL
RICHARD L. MOORE
INVENTORS

ROTARY ACTUATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of Invention:

The invention relates to a rotary actuator and more particularly to a rotary actuator particularly suited for use in displacing structures, such as pivotally supported members, such as solar panels and the like, stowed in a retracted configuration, aboard operative spacecraft.

2. Description of Prior Art:

In fabricating spacecraft and similar vehicles, it is common practice to incorporate deployable structures adapted to be stowed for launch and subsequently deployed once a successful launch is achieved. Such structures include solar panels, antenna masts and the like. In practice, electrically energizable motors and pivotally supported, solenoid operated linkages commonly are employed for deployment purposes, once an associated craft is in flight. As can readily be appreciated, significant quantities of stored electrical energy often is required in energizing such motors and solenoids. Additionally, where electrically energizable motors are utilized, the structures must be released and the motors or solenoids energized in an appropriate sequence and with minimal time lags in order to effect a desired deployment. This, of course, leads to incorporation of complex electrical circuitry, particularly where a plurality of relatively massive structures, such as solar panels, simultaneously are deployed.

Attempts heretofore have been made to utilize spring operated actuators in deploying structures stowed aboard spacecraft. These attempts have met with varying degrees of success. However, where the stored potential energy of deformed springs and the like is utilized, a common difficulty is encountered in achieving a desired controlled rate of deployment, since the spring-operated actuators heretofore employed tend to achieve a substantially instantaneous release of the potential energy stored therewithin. Consequently, the associated craft necessarily is subjected to deleterious effects of reaction shock forces developed as the structures are deployed and come to rest. Additionally, and as a practical matter, it is highly desirable that the linkages associated with the actuator thus employed subsequently function to support structure previously deployed thereby.

Consequently, even though a myriad of actuators, including electrically energizable and spring-actuated actuators, currently are available for use aboard spacecraft and the like, there currently exists a need for a practical system which is of a lightweight and simple construction, capable of achieving an instantaneous response for deploying relatively massive structures at determinable rates for thus eliminating reactive forces which are encountered during deployment of structures and which is capable of supporting the deployed structure with a maximized effect.

OBJECTS AND SUMMARY OF THE INVENTION

It is therefore an object of the instant invention to provide an improved rotary actuator.

It is another object to provide an improved actuator for use aboard spacecraft adapted to respond to a release of stored potential energy for achieving controlled deployment of solar panels stowed aboard spacecraft.

Another object is to provide an improved rotary actuator having a torsion bar operatively coupled with an output linkage through a gear cluster pivotally supporting a crank arm adapted to be displaced through an arcuate path of at least 180° whereby the output linkage experiences both positive and negative acceleration as the crank arm is displaced.

It is another object to provide a rotary actuator particularly suited for use aboard spacecraft adapted to be connected with and continuously urge stowed solar panels toward a deployed disposition.

It is another object to provide a rotary actuator capable of deploying solar panels from a stowed configuration to a deployed configuration with sinusoidal acceleration.

Another object is to provide a rotary actuator including a torsion bar and a gear cluster employable in continuously urging a stowed solar panel toward its deployed configuration, deploying the panel at a controlled, sinusoidal rate which serves to reduce the magnitude of reaction forces developed during deployment of the panel, and in supporting the deployed panel through moment arms of maximum lengths.

These and other objects and advantages are achieved through a use of a rotary actuator having a housing supported to be mounted aboard a spacecraft and supported for rotation about a given axis, including an actuator arm fixedly secured to the housing and radially extending therefrom with its distal end being pivotally coupled with one end of a drive link in a manner such that the opposite end of the link is, when confined to displacement about a remote pivot, is advanced with a sinusoidal acceleration in response to a driving output acquired from a torsion bar acting on the housing through a gear cluster.

DESCRIPTION OF THE PREFERRED EMBODIMENT

Figure 1:
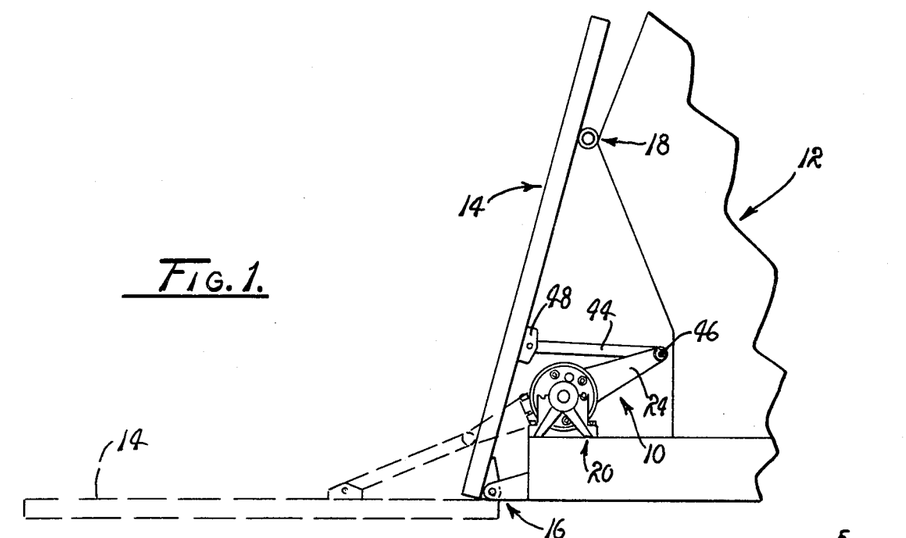
FIG. 1 is a fragmentary, elevational view depicting an operative mounting of a rotary actuator which embodies the principles of the instant invention.

Referring now to the drawings wherein like reference characters designate like or corresponding parts throughout the several views, there is shown in FIG. 1 a rotary actuator, generally designated 10, which embodies the principles of the instant invention. As illustrated, the actuator 10 is mounted aboard a spacecraft, generally designated 12 at any suitable location, and is operatively coupled with a solar panel 14 of a type supported to be stowed aboard a spacecraft and subsequently deployed into an extended relationship with the craft, through pivotal displacement.

In practice, the solar panel 14 is retained in a retracted and stowed configuration by means of a suitable pivot coupling 16, which serves to couple the panel 14 with the craft 12 and a retractable latch pin 18 which serves to latch and thus secure the panel 14 in its stowed configuration until such time as the pin is retracted for effecting disengagement. Since the pin 18 is retracted through any suitable mechanism, a detailed description of the specific mechanism employed is omitted as it forms no specific part of the instant invention. It is, of course, to be understood that once released, the panel 14 is driven in rotation, relative to the coupling 16, as the actuator drive linkage is activated.

ACTUATOR DRIVE LINKAGE

Figure 2:
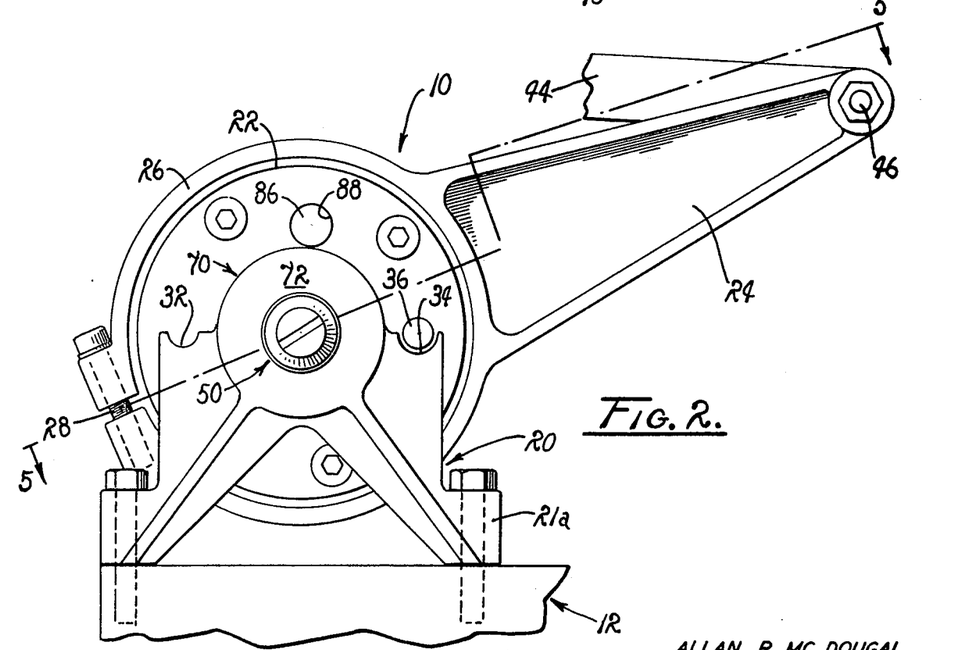
FIG. 2 is an end elevation, on an enlarged scale, of the actuator of FIG. 1.
Figure 3:
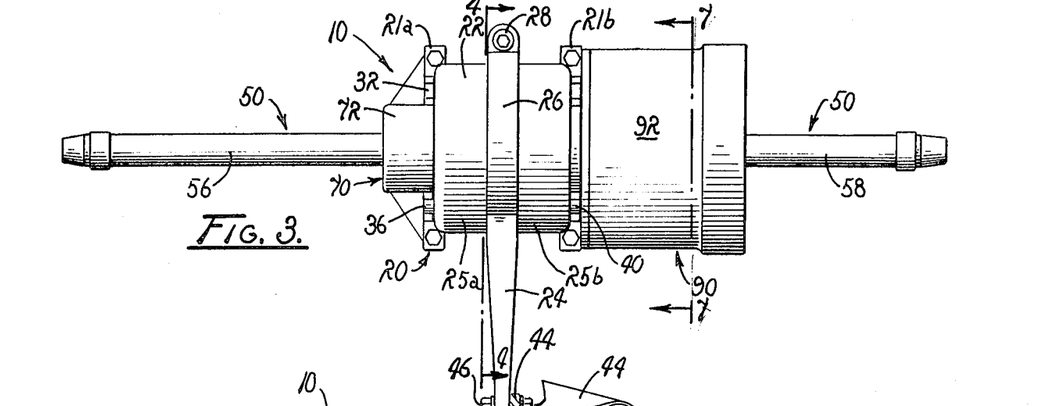
FIG. 3 is a top plan view of the actuator shown in FIG. 2.

As best illustrated in FIGS. 2 and 3, the actuator 10 operatively is supported by a rigid base, generally designated 20. The base 20 includes a pair of base legs 21a and 21b bolted or otherwise affixed to the associated spacecraft. The base 20, in practice, serves to operatively support a rotatable housing 22 through a pair of coaxially related bearing inserts 23, FIG. 5, seated therein. From the housing 22 there is extended a radial crank arm 24, of a rigid configuration. This arm, in effect, functions as the actuator's output link.

As a practical matter, the housing 22 is formed by operatively coupling two coaxially related bell housing components 25a and 25b, FIG. 3, each being a substantial mirror image of the other. In practice, the components 25a and 25b are locked in a mated configuration by a circumscribing clamp ring 26. While the clamp ring 26 is, in practice, of any suitable configuration, as shown, the clamp ring 26 is provided with an annular V-channel 30, FIG. 5, mated in camming relationship with an abutted pair of annular lips 27 which establish a peripheral protrusion extending about the housing 22. A screw-threaded stud 28 is utilized for drawing the clamp ring 26 into a fixed relationship with the housing 22.

As shown, the clamp ring 26 also is integrally related with the crank arm 24 and, accordingly, is suited for functioning as a mounting structure for adjustably coupling the crank arm 24 on the housing 22. Simply by adjusting the relative angular position of the clamp ring 26 about the housing 22, the angular relationship of the crank arm 24 relative to the base 20 can be varied, as desired.

As best illustrated in FIG. 2, the base 20 also is provided with a pair of substantially coplanar detents 32 and 34 configured to receive therewithin a stop lug 36 fixed to the housing 22. The stop lug 36 is employed to preclude inadvertently imposed excessive rotation of the housing for thus protecting the hereafter described torsion bar assembly. In practice, the stop lug 36 is provided as a head of an elongated pin 38, which is extended through the housing 22 and terminates at its opposite end in a drive lug 40. The specific function of the drive lug 40 will hereinafter be more fully described and appreciated.

As a practical matter, the pin 38 is inserted into the housing 22 after the crank arm 24 has been secured thereto and the housing rotated to a selected angular disposition, relative to the base 20. While various devices can be employed in locking the pin 38 in an operative disposition, a snap ring 42 seated within an appropriately formed groove functions quite satisfactorily for this purpose.

Consequently, it should be apparent that as the housing 22 is rotated to a position wherein the crank arm 24 is advanced to a "cocked" position, as illustrated in FIG. 1, the panel 14 is stowed, subsequently to be released and rotated in an opposite direction, through approximately 120° of angular displacement, for purposes of advancing the panel 14 into its deployed disposition.

In order to assure that the panel 14 is deployed without initiating reaction shock forces, the crank arm 24 operatively is coupled with the solar panel 14 through a drive link 44. The drive link 44 is incorporated in a mechanical linkage, sometimes called a four-bar linkage capable of imparting a sinusoidal acceleration to the panel 14. The drive link 44 pivotally is coupled at the distal end of the crank arm 24 by a bearing pin 46, FIG. 2, and also is coupled with the solar panel 14 through a suitable pivot coupling 48 which permits the link 44 to pivot relative to the panel.

It is believed important to note that the pivot coupling 48 is spaced from the coupling 16 a distance such that the moment arm of the force acting about the pivot coupling 16, for supporting the solar panel 14 in an operative, laterally related disposition, is maximized in order that maximum rigidity be imparted to the panel 14 through an application of a minimal force.

It also is believed important to understand that the crank arm 24, acting through the link 44 as it is pivotally displaced, displaces the solar panel 14 with a varying rate of acceleration, which acceleration is a positive acceleration for approximately the first 60° of rotation of the housing 22, and then becomes a negative value for the remaining approximately 60°. This rate of acceleration is hereinafter referred to as a sinusoidal acceleration and is illustrated in FIG. 14.

Since the crank arm motion required in achieving the sinusoidal acceleration is well understood, a detailed description thereof is omitted. However, it is important to understand that as the arm 24 is rotated, along with the housing 22, the drive link 44 serves to accelerate the panel 14 from its stowed disposition, at a declining rate, and subsequently decelerates the panel 14 as the panel is caused to assume a deployed configuration laterally extended from the associated craft. Due to the sinusoidal acceleration of the panel, the magnitude of reaction shock forces significantly are reduced and the net effect imposed on the course of travel of the spacecraft substantially is eliminated.

TORSION BAR ASSEMBLY

Figures 4, 6, 13, 14:
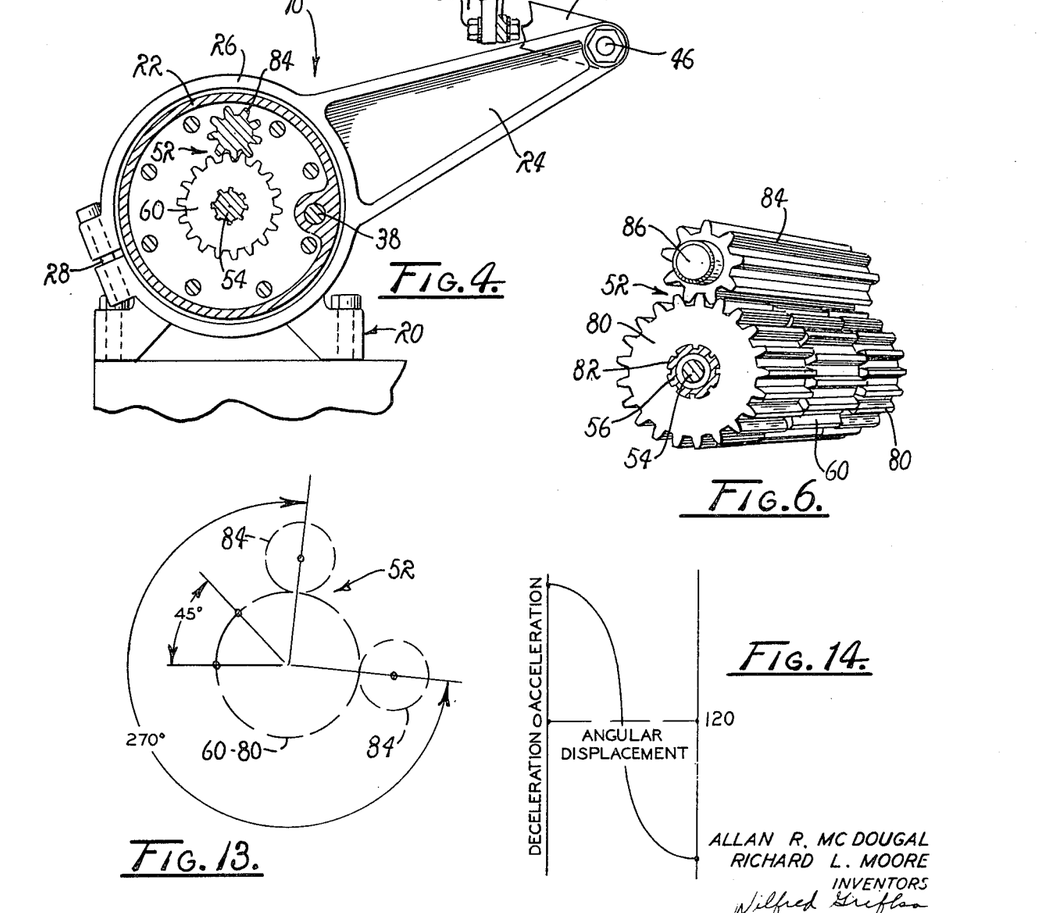
FIG. 4 is a cross-sectional end elevation, taken generally along line 4—4 of FIG. 3.
FIG. 6 is a perspective view of the gear cluster shown in FIG. 5.
FIG. 13 is a diagrammatic view illustrating the relative limits of rotation of the actuator housing and the torsion bar.
FIG. 14 is a graphic illustration of the variable rate of acceleration imparted to the solar panel as it is deployed by an actuator embodying the principles of the instant invention.
Figure 5:
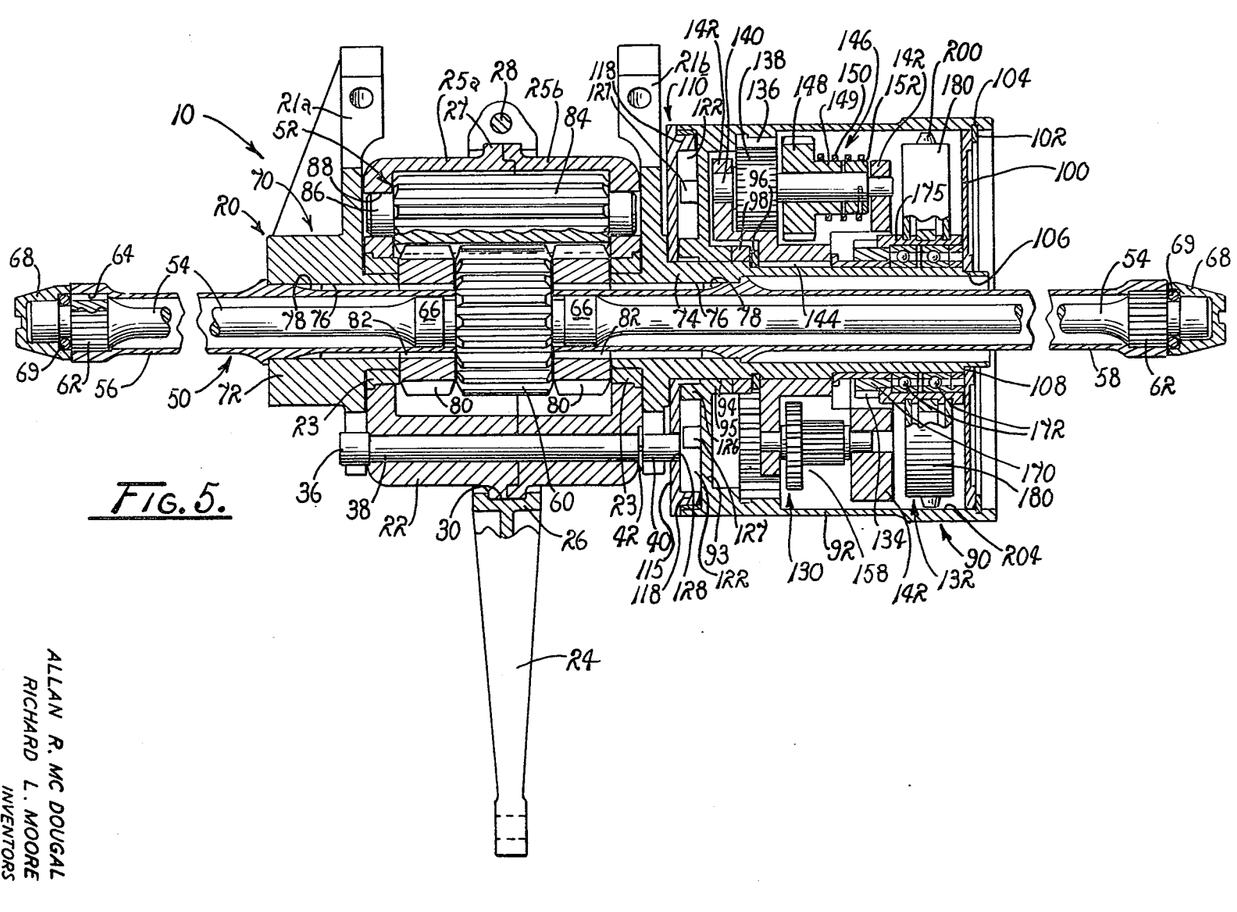
FIG. 5 is a cross-sectional plan view taken generally along line 5—5 of FIG. 2, illustrating the mounting and operative coupling of a torsion bar assembly, a gear cluster and a governor interrelated and mounted within the actuator housing.

As illustrated in FIGS. 4 through 6, the housing 22, as it is driven to deploy the panel 14, is activated by a deformable torsion bar assembly, generally designated 50, operatively coupled with the housing 22 through a gear cluster 52. The gear cluster 52 is provided with an established gear ratio which permits the housing 22 to be rotated about the torsion bar assembly 50 while imparting thereto a disproportionate magnitude of rotation. As currently employed, the gear cluster 52 has a 6 to 1 ratio which permits the housing 22 to be advanced through 270° of angular displacement, while rotation of the torsion bar assembly 50 is limited to only 45°, of rotational deformation. Of course, potential energy mechanically operatively is stored within the torsion bar assembly as the housing 22 and the panel 14 is retracted to its stowed configuration during assembly of the spacecraft 12.

The torsion bar assembly 50, in effect, is a folded torsion bar and includes an elongated rod 54 formed of stock characterized by a selected elasticity. The rod 54 concentrically is related to a pair of coaxially aligned, relatively rigid cylindrical members or tubes 56 and 58, also fabricated from stock material having a selected elasticity. The adjacent ends of the tubes are mutually spaced in a distance sufficient for receiving therebetween a bull gear 60 rigidly secured to a selected mid-portion of the rod 54.

As a practical matter, the bull gear 60 is fixed to the rod 54 by a mated pair of annular arrays of splines, not designated. The internal surface of the bull gear 60 is provided with a first annular array of splines, FIG. 4, and a second array of splines are formed about the external surface of the rod 54 in order that the bull gear 60 be locked against rotation relative to the rod 54. Of course, it should readily be apparent that the bull gear 60 can be pinned or otherwise fixed to the rod 54 in any manner suitable to assure that rotation therebetween is precluded.

The rod 54, in turn, is fixedly coupled, at its opposite ends, to the tubes 56 and 58. As shown in FIG. 5, the rod 54 also is coupled with the tubes through a pair of external arrays of splines 62, formed on the opposite ends of the rod 54. Each of these arrays mates with an array of splines 64 provided internally of the outermost end of each of the tubes 56 and 58. Therefore, it is to be understood that the bull gear 60 is afforded rotation relative to each of the tubes 56 and 58, as the tubes 56 and 58, as well as the rod 54, are deformed within their elastic limits. Such deformation serves to store potential energy in an understood manner consistent with the operation of torsion bar assemblies.

As a practical matter, the rod 54 also is provided with a pair of bearing surfaces 66 seated within the adjacent end portions of the tubes 56 and 58 so that the bull gear 60 is supported for rotation as the rod 54 and tubes 56 and 58 are torqued and thus deformed. If desired, a suitable lubricant can be applied to the adjacent bearing surfaces. Additionally, closure caps 68 and lock rings 69 are employed at the opposite ends of the rod 54 for inhibiting axial displacement of the rod relative to the tubes.

The torsion bar assembly 50 is extended through the base 20 and the bearing insert 23, of the housing 22, and operatively is supported by a tubular casing, generally designated 70, integrally related with the base 20.

As best illustrated in FIG. 5, the casing 70 includes a first segment 72 and a coaxially related segment 74. The segment 72 extends from the base leg 21a in a concentric relationship with the bearing insert 23, while the segment 74 is extended from the base leg 21b and is maintained in coaxial relationship with the segment 72. The internal surface of the casing 70 is provided with an annular array of elongated splines 76, while the external surfaces of the tubes 56 and 58 are splined to provide matching arrays of splines 78. These splines matingly are received by the splines 76 in a manner such that relative rotation between the adjacent portions of the tubes 56 and 58 and the respective casing components 72 and 74 effectively is precluded.

Consequently, it should readily be apparent that rotation imparted to the bull gear 60 serves to deform the rod 54 and the tubes 56 and 58 of the torsion bar assembly 50, as the innermost ends of the tubes 56 and 58 are secured against rotation relative to the base 20 by the mated arrays of splines 76 and 78. So long as the rod 54 and tubes 56 and 58 are deformed within their elastic limits, recovery of the torsion bar to an original configuration serves to release potential energy deliverable through the bull gear 60. Hence, the bull gear 60, in effect, acts as an input gear for deforming and thus storing potential energy, as well as an output gear as the rod 54 and tubes 56 and 58 are permitted to recover for delivering the thus stored potential energy.

Also splined to the peripheral surfaces of the tubes 56 and 58 there is a pair of sun gears 80. Each of these gears includes an internal array of splines 82, which also is mated with the array of splines 78 for fixedly coupling the sun gears to the external surfaces of the tubes 56 and 58 so that these gears substantially are secured against rotation relative to the casing 70 and hence the base 20. Of course, the extent of rotation of the sun gears is dictated by the modulus of elasticity of the tubes 56 and 58. Therefore, it is to be understood that as the housing 22 is rotated on the bearing surfaces 23, formed on the base legs 21a and 21b, the sun gears 80 remain stationary and the housing necessarily is rotated relative thereto.

Within the housing 22, there is pinned for rotation a planetary gear 84 of a cylindrical configuration. This gear is supported by the housing 22 for rotation about an axis paralleling the axis of rotation of the bull gear 60. the planetary gear 84 is meshed with the pair of sun gears 80 as well as the bull gear 60. Therefore, it is to be understood that the gears 60, 80 and 84 together define the gear cluster 52, which serves to deform the torsion bar assembly and by which potential energy is stored within the rod 54 and the tubes 56 and 58 as they are deformed within their elastic limits. Of course, it also will be appreciated that the actuator 10 is driven as the stored potential energy is released and delivered through the gear cluster, as the deformed rod and tubes are permitted to relax and to recover their initial configuration.

As a practical matter, the planetary gear 84 is of a cylindrical configuration and includes terminal bearings 86 rotatably seated within a pair of coaxially related annular bearings 88 formed in the opposite walls of the bell housing components 25a and 25b. Therefore, it can readily be appreciated that as the housing 22 is rotated relative to the base 20 the planetary gear 84 is caused to "walk" along an arcuate path partially circumscribing the pair of sun gears 82. Consequently, this "walking" acts to impart to the gear 84 rotation about its own axis, as it simultaneously is advanced along the arcuate path. The "walking" effect is achieved due to the driving effects of the meshed teeth of the planetary gear and the pair of rigidly supported sun gears 80.

The rotation imparted to the planetary gear 84 by the pair of sun gears 80, is transmitted to the bull gear 60 for purposes of applying torque to the rod 54 and the tubes 56 and 58, for thus achieving a deformation thereof. Transmission of the rotation is achieved by providing the bull gear 60, the pair of sun gears 80, and the planetary gear 84 with mutually unique numbers of teeth.

In practice, it has been found practical to torque the rod 54 and tubes 56 and 58 through 45° of angular rotation, as best illustrated in FIG. 13, while advancing the housing 22 through 270° of angular displacement. Accordingly, a 6 to 1 gear ratio preferably is established between the planetary gear 84 and the bull gear 60. Such a ratio is established by providing the planetary gear 84 with nine teeth, the bull gear 60 with eighteen teeth, and the pair of sun gears twenty-one teeth. Hence, as the housing 22 angularly is displaced about its axis of rotation, the planetary gear is driven in rotation relative to its own axis of rotation, due to the effects of the pair of sun gears 80, and this rotation being disproportionately transmitted to the bull gear 60 for applying the desired torque to the rod 54 in order to appropriately deform the rod 54 and the tubes 56 and 58.

As a practical matter, should it become desirable to do so, the gear ratio of a cluster can be varied in a known manner for varying the relative angular displacement of the bull gear 60, as the housing 22 is rotated in order to accommodate changes in operational parameters.

In view of the foregoing description of the actuator 10, it should readily be apparent that the housing 22, the torsion bar assembly 50 and the gear cluster 52 are assembled while the rod 54 and tubes 56 and 58 are in a relaxed and unloaded condition. In order to deform the rod 54 and tubes 56 and 58 of the torsion bar assembly 50, the housing 22 is rotated in a clockwise direction, as viewed in FIG. 13, in a manner such that the planetary gear 84 is driven by the pair of sun gears 80 for imparting rotational displacement to the bull gear 60, whereupon torque is applied to the rod 54 and tubes 56 and 58. The rod and tubes responsively are deformed for purposes of mechanically storing therewithin potential energy. In the event the housing 22 is released for rotation, the stored potential energy of the rod 54 and tubes 56 and 58 is rendered effective, through the bull gear 60, for driving the planetary gear 84 in rotation. This rotation causes the housing 22 to be displaced about its axis of rotation.

Since the actuator 10 is coupled with the pivotally supported solar panel 14, through a drive link 44, the panel 14 pivotally is displaced about its pivotal axis with a sinusoidal acceleration, varying between zero and zero, as the crank arm 24 is advanced through 180° and the panel 14 is advanced through approximately 120° of angular displacement.

GOVERNOR ASSEMBLY

In order to inhibit an instantaneous release of the potential energy stored within the torsion bar assembly 50, it is desirable to employ a governor assembly, generally designated 90. This assembly acts to impede pivotal displacement of the panel 14 as the housing is driven in a response to a release of potential energy stored in the torsion bar assembly.

As illustrated in FIGS. 3 and 5, the governor 90 is housed in a shell 92. The shell 92 is of a substantially cylindrical configuration and concentrically is related to the casing 70 and is supported for rotation about the external surface of the segment 74 of the casing 70. Support of the shell is achieved by a transverse end wall 93, formed as a radially extended, integral portion of the shell 92. The wall 93 includes a concentric cylindrical sleeve having an annular surface defining a bearing surface 94. This surface circumscribes and is seated on an external bearing surface formed about the external surface, not designated, of the segment 74 of the casing 70. These surfaces serve to support the shell 92 for rotation relative to the segment.

The bearing surface 94 is supported in an appropriate axial position relative to the segment 74 of the casing 70 by a lock washer 96 and an annular spacer 98 seated on the segment 74 for securing the shell 92 against axial displacement relative thereto. The opposite end of the shell 92 also is secured to the segment 74, at its distal end, by means of a radial end plate 100 locked in place by an annular snap ring 102. The snap ring 102 is of any convenient design and is seated in an appropriately formed groove 104 circumscribing the internal distal portion of the shell 92.

The end plate 100 includes an annular opening 106 through which is extended the segment 74 of the casing 70 and is seated against an annular shoulder 108. If desired, an additional snap ring, not shown, can be employed about the distal end of the segment 74 for further securing the shell 92 against axial displacement relative to the segment 74.

Figure 9:
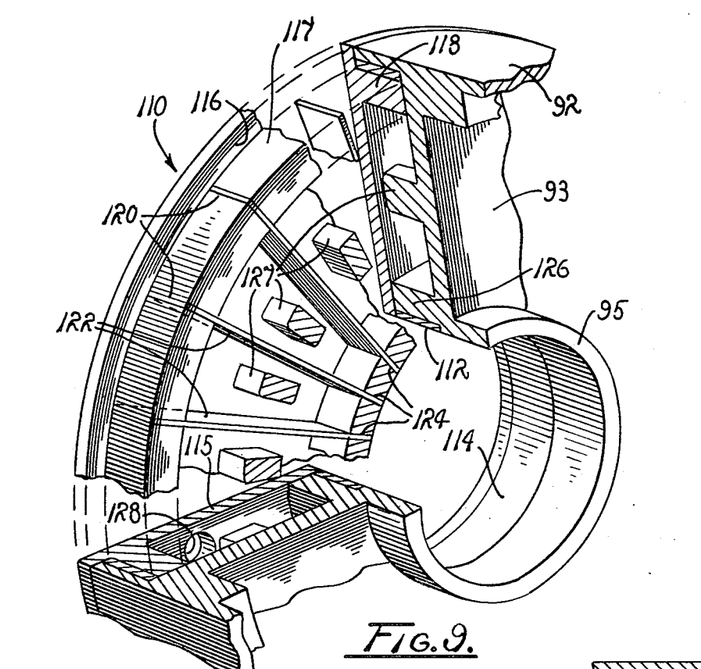
FIG. 9 is a perspective, fragmentary view of a rotary shock absorber employed in coupling the governor with the actuator housing.

The shell 92, in turn, is coupled with the housing 22 through a rotary shock absorber, generally designated 110. The shock absorber 110 is of a substantially disk-shaped configuration and also is mounted for rotation on the peripheral surface of the segment 74. As best illustrated in FIG. 9, the rotary shock absorber 110 includes a tubular hub 112, having an internal plane bearing surface 114 seated for rotation about the external surface of the segment 74 of the casing 70. Extended radially from the hub 112, and rigidly fixed thereto, is a plate 115, the peripheral portion of which includes an annular shoulder 116. This shoulder functions as a radially extended, annular bearing surface engageable with an adjacent annular surface 117 of the shell 92 as relative rotation is established therebetween.

Adjacent to the shoulder 116, and concentrically related to the hub 112, there is provided an anchor ring 118. This ring is provided with a plurality of radially extended and appropriately spaced slots 120, which receive therewithin the distal ends of a plurality of radially extended leaf springs 122. These springs are provided with a suitable modulus of elasticity in order that a flexing thereof be accommodated for dissipating rotational forces. The base or opposite ends of the leaf springs 122 are seated in appropriately configured and spaced slots 124 formed in an annular ring 126 extended from the end wall 93 and concentrically related to the hub 112. The ring 126 preferably is integrally related to the end wall 93.

Hence, it can be appreciated that the rotary shock absorber 110 is coupled to the shell 92 through the plurality of radially extended leaf springs 122 so that a "soft coupling" is achieved between the governor 90 and the housing 22 in order that established inertia is dissipated through a flexing of the springs 122.

In practice, it has been found desirable to employ a plurality of mutually spaced bosses 127 which are fixed to and extended axially from the end wall 93 and into the path of the leaf springs 122 for purposes of assuring that a positive coupling of the shell 92 with the shock absorber 110 is achieved as the springs are deformed. This, of course, assures that the shell 92 is rotated concurrently with the shock absorber 110.

In order to couple the housing 22 with the rotary shock absorber 110, for thereby coupling the governor 90 with the housing 22, the end wall 115 is provided with an opening 128. This opening serves to receive therewithin the aforementioned drive lug 40 for thereby effecting a drive coupling between the shock absorber 110 and the housing 22. Hence, the rotary shock absorber 110 and the housing 22 positively are coupled, through the drive lug 40, so that the rotary shock absorber 110 is caused to follow the housing 22 in rotation, regardless of the direction of the rotation imparted thereto. Of course, such rotation is transmitted through the leaf springs 122 and bosses 127 to the shell 92 for imparting rotation thereto.

Within the shell 92 there is provided a gear train 130 which responds to rotation imparted to the shell 92 and serves to drive a rotatably supported brake assembly 132. The assembly 132, upon being driven in rotation and through the shock absorber 110, acts to impede rotation of the housing 22. Consequently, the rate at which the potential energy stored within the torsion bar assembly 50 is released effectively is controlled. Of course, the velocity of the crank arm 24, as the panel 14 is deployed, also is thus controlled.

Figure 7:
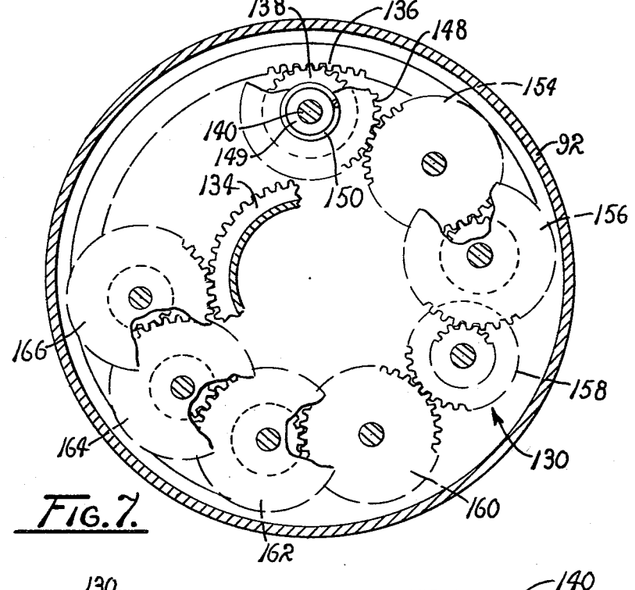
FIG. 7 is a cross-sectional end view of a gear train employed by the governor shown in FIG. 5, taken generally along line 7—7 of FIG. 3.
Figure 10:
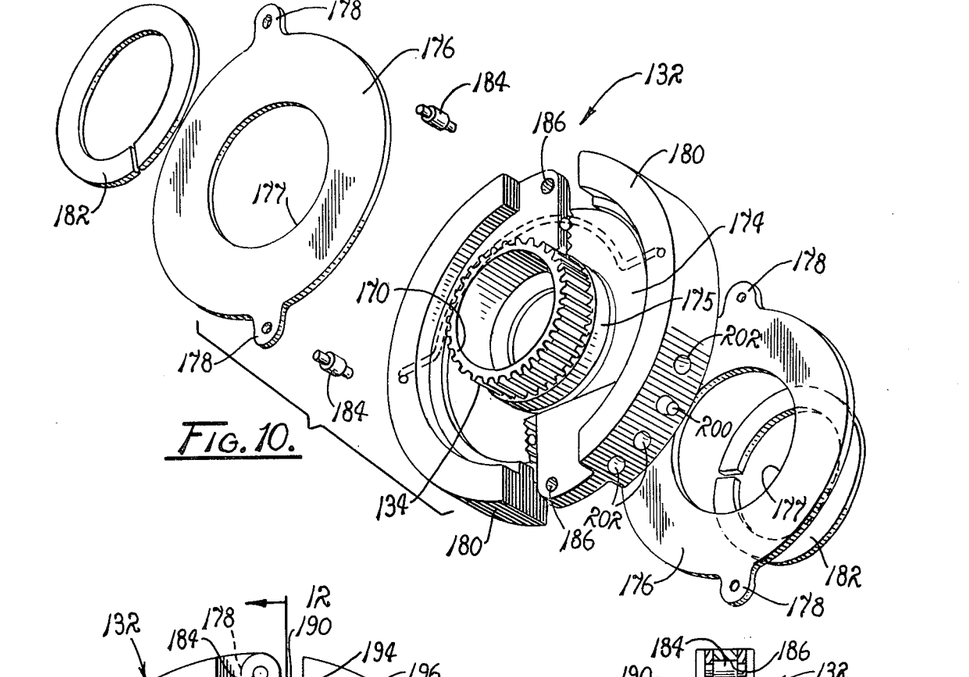
FIG. 10 is a perspective exploded view of a brake shoe assembly employed by the governor illustrated in FIG. 5 and driven by the gear train illustrated in FIGS. 7 and 8.

The gear train 130, FIG. 7, is coupled with a driven ring gear 134, FIGS. 7 and 10, of the brake assembly 132. This gear acts to drive the brake assembly 132 with a speed change ratio of 166 to 1. Hence, even though the brake assembly 132 and the shell 92 are, in practice, driven in a common direction, the shell 92 can be considered to be stationary with respect to the brake assembly 132 so that the gear train is, in operation, impeded.

Activation of the gear train 130 is initiated through a ring gear 136 fixedly secured to the internal surfaces of the shell 92, FIG. 7. The particular manner in which the ring gear 136 is secured to the shell 92 is deemed to be a matter of convenience and, accordingly, may be varied as found desirable. The ring gear 136, in turn, is meshed with a spur gear 138 fixed to a rotatably supported drive shaft 140. The shaft 140, FIG. 5, fixedly is supported for rotation about its own axis through a stationary bracket 142 supported by the external surface of the segment 74 of the casing 72. A key and slot coupling 144, FIG. 5, is employed in securely coupling the bracket 142 with the segment 74. Hence, the spur gear 138 is supported for rotation by the drive shaft 140 and is driven in rotation about its own axis as the ring gear 136 rotatably is advanced as the shell 92 is driven in rotation relative to the casing 72.

The spur gear 138 is, through the shaft 140, also coupled with a one-way clutch 146 in order that the gear train 130 be operatively driven or activated only when the shell 92 is driven in rotation as the panel 14 is deployed. This clutch includes a rotatable spur gear 148 seated for free rotation about the shaft 140 and includes a sleeve 149 integrally related to the gear 148 and concentrically related to the shaft 140. About the sleeve 149 there is wound a helical square wire spring 150. Adjacent to the terminal portion of the sleeve 149 there is fixedly secured to the drive shaft 140 a boss 152, of an annular configuration, which also is circumscribed by the spring 150. As is common knowledge, square wire springs may be employed as friction clutches since the direction of rotation of the driver relative to the direction of the helix of the spring dictates the grasping effect of the spring as the circumscribed surfaces are rotated. Hence, as the shaft 140 and boss 152 are rotated in a direction common to the direction of the helix of the spring 150, the spring is tightened about the sleeve 149 for frictionally gripping its surface to thereby impart rotation to the sleeve and, consequently, cause the spur gear 148 to rotate in unison with the shaft 140.

Figure 8:
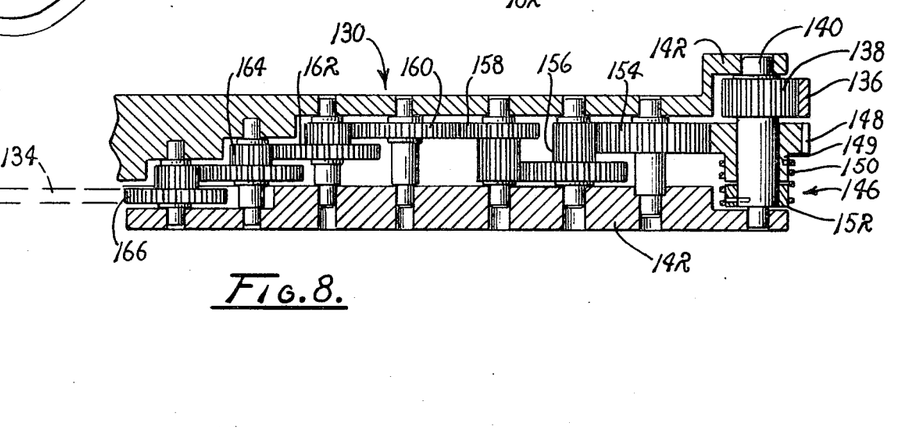
FIG. 8 is a partial and exaggerated top plan view of the gear train of FIG. 7.

Rotation of the spur gear 148 is transmitted to an adjacent gear 154 meshed therewith. The gear 154, FIG. 8, is, in turn, meshed with a compound gear 156 which, in turn, is meshed with a compound gear 158. Thus "gearing up" of the gear train is effected through a series of gears 154 through 166 meshed in a known fashion and coupled with the ring gear 134 of the brake assembly 132 and function to drive the brake assembly at a selected speed change.

Figure 11:
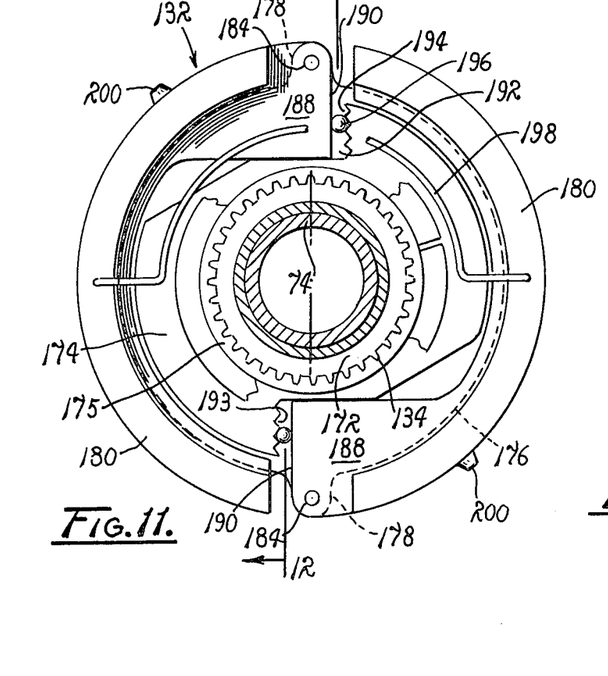
FIG. 11 is an end elevation of the brake shoe assembly of FIG. 10.
Figure 12:
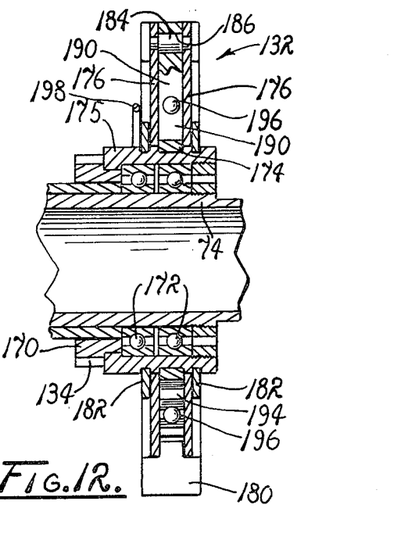
FIG. 12 is a fragmentary, partially sectioned elevation taken generally along line 12—12 of FIG. 11.

The brake assembly 132, FIGS. 10, 11 and 12, includes a driven hub 170 integrally related to the driving gear 134. The hub 170 is supported for rotation about its own axis through a plurality of bearing races 172 seated on the segment 74 and serves to support the brake assembly 132 for rotation.

Fixed to the hub 170 is a truncated driver plate 174 which is driven in rotation as the driving gear 134 imparts rotation to the hub 170. The plate 174 is coupled with the hub 170 through a splined sleeve 175. At the opposite sides of the plate 174 there is provided a pair of supporting plates 176. These plates are supported at concentric openings 177 for free rotation relative to the sleeve 175, and includes oppositely disposed ears 178 which serve as pivotal mounts for supporting a pair of brake shoes 180. The supporting plates 176 are secured against axial displacement by a pair of snap rings 182 seated in annular grooves, not designated, formed in the peripheral surface of the hub 170.

A mounting of the brake shoes 180 is achieved through a pair of bearing pins 184, FIG. 10. Each bearing pin includes a cylindrical bearing surface adapted to be received within a sleeve-like opening 186 formed within each of the shoes 180 for pivotally coupling the brake shoes 180 with the plates 176. Hence, it is to be understood that the pair of brake shoes 180 pivotally are supported at diametrically opposed points through the use of the ears 178 and that angular displacement imparted to the shoes develop force vectors which cause the shoes to pivot about the pins 184 and away from the hub 170.

Each of the shoes 180 also includes a shoulder 188 having a radially extended surface 190 seated within a relieved portion 192 of the driver plate 174. Adjacent to the surface 190, the driver plate 174 is provided with a radially extended, axially serrated surface 193. This surface includes a plurality of longitudinally extended and radially spaced notches 194 which receive therewithin a ball 196. Since the plates 176 are mounted for free rotation, relative to the hub 170, forces required to effect a rotation of the plates 176 and the brake shoes 180 are transferred through the balls 196, each acting against a radially extended surface 190 of one of the shoulders 188.

As can readily be appreciated, due to the fact that each of the brake shoes 180 are supported to be pivoted about a pin 184, the driver plate 174 delivers through one of the balls 196 and to each shoulder 188, a normally directed force which acts about a moment arm having a length determined by the spacing of the ball 196 relative to the associated pivot pin 184. Hence, the force applied by the driver plate 174, through the ball 196, also serves to pivotally rotate the brake shoes about the pivot pins 184, as well as to drive the shoes in rotation about their axis of rotation, to thus cause the brake assembly 132 to expand by urging the brake shoes 180 in pivotal displacement. The magnitude of the outwardly directed force which can be applied by the thus pivoted brake shoes 180 can be varied simply by varying the moment arm by repositioning the ball 196 relative to the pivot pins 184.

Accordingly, it should readily be apparent that the brake shoes 180 are separated as the hub 170 is driven in rotation, due to the effects of developed inertia, as well as to the effect of the forces applied to the shoulders 188 through the balls 196.

As a practical matter, the brake assembly 132 continuously is contracted through a resilient spring 198 which continuously urges the brake shoes in contraction toward the hub 170, but which has a modulus of elasticity such that the applied forces of inertia and the driving force applied to the shoulder 188 through the ball 196 act to overcome the forces of the spring.

The particular material from which the individual brake shoes 180 is fabricated is varied as found practical. As currently employed the brake shoes include a series of buttons 200 formed of a composition material having selected heat dissipating wear and friction developing characteristics. These buttons are seated in openings 202 formed in the surfaces of the shoes. Since the characteristics of the buttons are, in part, determined by the operative environment, the design characteristics can be varied. Of course, the positioning of the buttons 200 relative to the points at which the shoes are pivoted serve to determine the force with which the buttons are forced outwardly from the hub and into engagement with the shell 92 at its internal surface.

The internal surface of the shell 92, designated 204, circumscribes the pair of brake shoes 180 and, in effect, serves as a brake drum. Hence, as the shoes 180 are forced outwardly, the buttons 200, FIG. 5, engage the surface 204 for purposes of developing motion retarding friction of a magnitude determined by the force at which the pair of brake shoes 180 are radially expanded, as well as the coefficient of friction of the material of the buttons 200 and the internal surface of the shell 92. Since the hub 170 is driven at an angular velocity of 166 to 1 with respect to the velocity of the shell 92, the surface 204 appears stationary, when compared to the velocity of the pair of brake shoes 180.

Accordingly, as the shell 92 is driven in a counterclockwise rotation, as viewed in FIGS. 1 and 2, the gear train 130 serves to accelerate the brake assembly 132 for thereby increasing the angular velocity of the brake assembly relative to the rate of angular velocity imparted to the shell 92, while simultaneously causing the brake shoes to pivot outwardly for driving the buttons 200 into engagement with the surface 204. Although the shell 92 is rotating in a direction common to that of the brake assembly 132 the thus established difference in velocities is sufficiently great to cause the developed friction to impede rotation of the brake assembly 132 and thus control the speed of the gears of the gear train 130. This control in speed initiates a reactive braking force which is transmitted from the gear train 130 to the rotary shock absorber 110, through the ring gear 136 and shell 92. This force then is applied to the housing 22, through the drive lug 40, for controlling the displacement of the housing 22 and to thereby effect a control of the velocity of the crank arm 24.

OPERATION

It is believed that in view of the foregoing description, the operation of the device will be readily understood and it will be briefly reviewed at this point.

As illustrated in FIG. 1, the actuator 10 is mounted on a suitable support, here illustrated as a spacecraft 12, through the base 20. The arm 24 is selectively positioned relative to the housing 22 and fixed thereto through a tightening of the stud 28. The link 44 is coupled at the distal end of the actuator arm 24, through the pin 46, and to the panel 14 through the pivot coupling 48. Where desired, assembly may be achieved with the panel 14 being reversely rotated 270° from the position illustrated in FIG. 1.

Once the actuator 10 has been coupled with the panel 14, the panel is rotated about its pivot coupling 16 to the position illustrated in FIG. 1 and locked in this position utilizing retractable pins 18. As the panel 14 pivotally is rotated to its stowed configuration, the torsion bar 54 and tubes 56 and 58 are deformed through 45° of angular displacement, FIG. 13, due to the fact that housing 22 rotatably is displaced so that the planetary gear 84 is caused to advance about the pair of sun gears 80 for thus driving the bull gear 60 through 45° of rotation. Thus potential energy is stored within the torsion bar assembly 50. The panel 14 now is latched in place by the latch pin 18.

In order to deploy the panel 14, the pin 18 retractably is released, whereupon the housing 22 is released and the torsion bar assembly 50 is permitted to recover. As the assembly 50 recovers, the bull gear 60, meshed with the planetary gear 84, serves to impart rotation to the planetary gear 84 for causing the housing 22 to rotate, in a counterclockwise direction, as viewed in FIG. 1, whereupon angular velocity is imparted to the crank arm 24. As the crank arm 24 is advanced from its rest position, the pivot pin 46 is caused to describe an arc about the axis of rotation of the rod 54. As is well known, the solar panel 14, relative to the pivot pin 46 initially is accelerated and subsequently is decelerated as the pivot pin is advanced through substantially 180° of angular displacement. This displacement causes the panel 14 to accelerate from its stowed configuration, and to decelerate, as it approaches a deployed configuration, so that the panel is deployed in a manner which minimizes the effect of reaction forces.

As the panel 14 is deployed, the stop lug 36 is caused to engage the detent 32 for thereby positively arresting the displacement of the housing 22. However, a braking or retarding force is applied to the housing 22 through the effects of the brake assembly 132, which, through the gear train 130, causes the pair of brake shoes 180 to frictionally engage the surface 204 of the shell 92, whereupon the rotation of the shell 92 is impeded through the effects of the gear train 130. This braking force is delivered to the housing 22 through the rotary shock absorber 110, as the leaf springs 122 are deflected into engagement with the bosses 127 in response to the release of the potential energy of the torsion bar assembly 50. The flexing of the leaf springs and the spacing of the bosses 127 accommodate a minimal rotation of the end wall 115, relative to the shell 92, for accommodating the effects of shock and the like which may be experienced at take-off. It should be apparent, however, that after engagement is effected between the bosses and the leaf springs, some flexing of these springs will occur. The retarding force thus is transmitted to the housing 22 through the lug 40 for thereby controlling the angular velocity of crank arm 24 which, in turn, controls the acceleration and deceleration of panel 14 as it is deployed.

It is to be understood, of course, that as the lug 36 engages the detent 32, for arresting motion of the housing 22, the rotating parts of the governor 90 can through the action of the clutch 146 override the effects of the arrested housing and then coast to a stop, impeded only by the decaying friction of the brake assembly 132. Thus, no shock is applied by the governor or to the actuator due to the sudden stopping of housing 22 when pin 36 suddenly engages the detent stop 32.

It is to be understood also that the lug 36 is held in engagement with the detent 32 by the torsion bar assembly and that crank arm 24 and link 44 are in alignment thus effectively locking the panel 14 in its deployed configuration.

In view of the foregoing, it should be apparent that the instant invention provides a practical rotary actuator for use in pivotally deploying and supporting relatively massive structures.

Although the invention has been herein shown and described in what is conceived to be the most practical and preferred embodiment, it is recognized that departures may be made therefrom within the scope of the invention, which is not to be limited to the illustrative details disclosed.

What is claimed is:
1. A rotary actuator comprising:
   A. an actuator housing operatively supported for rotation about a given axis;
   B. an actuator arm fixed to and extended from said housing having a distal end adapted to be displaced along an arcuate path as the housing is rotated about said given axis;
   C. a torsion bar assembly mounted within said housing adapted to be deformed for releasably storing potential energy therewithin and to recover for releasing stored potential energy; and
   D. force delivering means interconnected with said torsion bar assembly and with said housing adapted to deform said torsion bar assembly for storing potential energy as the housing is rotated in a first direction, and further adapted to be driven by said torsion bar assembly for driving said housing in rotation in a second direction, opposite said first direction, as the torsion bar assembly is permitted to recover and stored potential energy is released.

2. The actuator of claim 1 further comprising:
   A. a rigid base; and
   B. means coupling said housing with said base supporting the housing for rotation relative thereto.

3. The actuator according to claim 2 wherein said torsion bar assembly comprises:
   A. a pair of coaxially related elastic tubes rigidly secured to said base;
   B. an elongated, elastic rod concentrically related to each tube of said pair of tubes; and
   C. coupling means rigidly coupling each end portion of said rod to an adjacent end portion of one of said tubes.

4. The actuator of claim 3 wherein said force delivery means includes a gear cluster comprising:
   A. a spur gear assembly including a pair of mutually spaced spur gears of a common diameter rigidly mounted on said pair of tubes;
   B. a bull gear interposed between said spur gears in coaxial relation therewith and fixedly secured to said rod, having a diameter coincident with the diameter of said spur gears and supported to be rotated with respect thereto; and
   C. a cylindrical gear having an axis of rotation fixed with respect to said housing and paralleling the given axis of rotation simultaneously meshed with said spur gears and said bull gear supported in a manner such that it is advanced along an arcuate path circumscribing said bull gear and said pair of spur gears as the housing is rotated relative to said base.

5. The actuator of claim 4 wherein said spur gears are provided with a number of peripheral teeth differing from the number of peripheral teeth provided for the bull gear.

6. The actuator of claim 5 further comprising a governor operatively coupled with said housing for controlling the rate of rotation imparted to said housing as it is driven in rotation by said torsion bar.

7. The actuator of claim 6 wherein said governor includes:
  A. a brake shoe assembly having an associated arcuate surface and a concentrically related pair of pivotally supported brake shoes mounted for rotation relative to said arcuate surface and adapted to be displaced in radial directions for frictionally engaging said surface;
  B. a rotatable shock absorber operatively coupled with said housing; and
  C. a gear train interposed between said brake shoe assembly and said rotatable shock absorber for imparting displacement to said brake shoes in response to displacement of said housing, whereby a braking effect is imparted to said housing through said rotatable shock absorber as the brake shoes engage said surface.

8. The actuator of claim 7 wherein said gear train includes a one-way clutch.

9. The actuator of claim 6 wherein said governor includes:
  A. an elongated tubular support integral with said base and coaxially related to said housing;
  B. a rotary shock absorber mounted for rotation about said tubular support;
  C. coupling means joining said housing to said shock absorber in a manner such that the housing serves to impart rotation to said shock absorber as the housing is driven in rotation;
  D. a shell seated on said tubular support and adapted to be rotated about an axis coincident with the longitudinal axis of the tubular support and operatively coupled with said rotary shock absorber;
  E. a gear assembly including ring gear secured to the internal surfaces of said shell having an axis of rotation coincident with the longitudinal axis of said tubular support and a spur gear meshed with said ring gear adapted to be driven in rotation by the ring gear;
  F. a one-way clutch operatively connected with said spur gear adapted to disengage when said shell and ring gear are advanced in a first direction of rotation and to engage when said shell and ring gear are rotated in a second direction opposite said first direction;
  G. a clutch output gear coupled with said one-way clutch adapted to be driven by said clutch when the clutch is engaged;
  H. a rotatably supported brake assembly disposed within said shell in concentric relationship therewith including a pair of brake shoes of an arcuate configuration mounted for rotation about said tubular support;
  I. pivot means pivotally supporting each of said shoes at one end thereof whereby said shoes are caused to pivot outwardly relative to said tubular support and into frictional engagement with the internal surface of said shell as the assembly is driven in rotation; and
  J. a gear train including a multiplicity of compound gears coupling said brake assembly with said clutch output gear so that the brake assembly is driven at a rate of rotation greater than that of the ring gear.

10. The actuator of claim 9 wherein said shock absorber includes a rotatable hub, a rotatable rim integrally related with said hub, a plurality of leaf springs radially extended between said hub and said rim adapted to be rotated therewith, and a plurality of bosses integrally related with said shell projected into operative engagement with said leaf springs adapted to deform the leaf springs for dissipating forces of inertia.

11. The actuator of claim 9 wherein said brake assembly further includes a pair of support plates concentrically mounted on said tubular support and adapted to be freely rotated thereabout, each of said plates having a pair of pin-receiving ears for receiving therewithin said pivot means whereby the brake assembly is supported for free rotation about said support, and a rotatable plate operatively coupled with said assembly and said gear train adapted to respond to said gear train and apply a rotating force to said brake assembly.

12. The actuator according to claim 11 further comprising adjusting means for varying the magnitude of the force with which said shoes are caused to engage said shell.

13. The actuator of claim 12 wherein said adjusting means comprises a shoulder integral with each of said shoes radially extended from said pivot means, and displaceable ball and detent coupling interposed between said rotatable drive plate and said shoulder through which said rotating face is applied to said brake assembly.

14. A rotary actuator comprising:
  A. a housing supported for rotation about a given axis;
  B. an actuator output means operatively associated with said housing adapted to be driven thereby;
  C. a torsion bar assembly operatively coupled with said housing adapted to drive said housing at a determinable rate of rotation about said given axis; and
  D. a governor operatively coupled with said housing adapted to control the rate of rotation at which said housing is driven.

15. The actuator of claim 14 wherein said governor includes:
  A. a rotatable shell adapted to be driven by said housing at a determinable rate;
  B. an expandable brake assembly mounted for rotation within the shell adapted to expand in a radial direction for frictionally engaging said shell; and
  C. a gear train coupling said brake assembly with said shell adapted to respond to rotation imparted to the shell to impart to said brake assembly a rate of rotation greater than the predetermined rate of rotation imparted to the shell.

16. A rotary actuator for deploying a solar panel pivotally supported aboard an operable spacecraft comprising:

A. an actuator base rigidly coupled to said spacecraft;
B. an actuator housing operatively supported for rotation relative to said rigid base and about a given axis of rotation;
C. a rigid actuator arm fixed to said housing and radially extending therefrom having a distal end adapted to be displaced along an arcuate path as the housing is rotated about said given axis;
D. stop means operatively associated with said housing adapted to restrict its rotation to 180° of rotational displacement;
E. a drive link pivotally coupled to the distal end of said actuator arm and adapted to be pivotally coupled to said solar panel whereby said actuator arm is adapted to impart both accelerating and decelerating rates of pivotal displacement to said solar panel as the housing is advanced through 180° of rotation;
F. a torsion bar assembly operatively associated with said housing;
G. a gear cluster interposed between the torsion bar and the housing in a manner such that the gear cluster serves to deform said torsion bar assembly as the housing is rotated in a first direction, for thereby storing potential energy within the torsion bar assembly, and to be driven by the torsion bar assembly for imparting to the housing rotation in a second direction, opposite the first direction as the stored potential energy is released; and
H. a governor including a brake assembly operatively coupled with said housing adapted to respond to rotation imparted to said housing for applying a rotation retarding force thereto.

17. An actuator for displacing at a variable rate of angular acceleration a pivotally supported member comprising:
A. an actuating linkage including a pivotal crank arm supported for pivotal rotation about a first given axis and a drive link having its base end pivotally coupled with the distal end of said crank arm;
B. means including a torsion bar coupled with said crank arm for driving the crank arm in pivotal rotation at a substantial constant rate; and
C. means including a pivot coupling affixed to the distal end of said drive link and adapted to be mounted on said member for supporting the distal end of said link for rotation about a second given axis paralleling said first given axis, whereby displacement of the distal end of said link along an arcuate path about said second given axis is accommodated.

18. The actuator of claim 17 further comprising a governor operatively coupled with said crank arm for impeding pivotal rotation thereof.

19. The actuator of claim 18 wherein said governor includes an expandable brake assembly including a pivotally supported pair of brake shoes and a circumscribing concentrically related surface.

20. The actuator of claim 18 wherein said governor further includes a rotary shock absorber interconnected with said brake assembly and said pivotal linkage.

21. The actuator of claim 17 wherein the distal end of said crank arm is driven from a first rest position through 180° of pivotal rotation to a second rest position wherein a coaxial relationship is established between said crank arm and said drive link.

* * * * *